(12) United States Patent
Degutis et al.

(10) Patent No.: US 7,685,884 B2
(45) Date of Patent: Mar. 30, 2010

(54) LOAD SENSING ARRANGEMENT

(75) Inventors: Alex V. Degutis, East Chicago, IN (US); Michael S. Ryan, Darien, IL (US); James M. McLaughlin, Monee, IL (US); Vedran Dzolovic, Park Ridge, IL (US)

(73) Assignee: Amsted Rail Company, Inc, Granite City, IL (US)

( * ) Notice: Subject to any disclaimer, the term of this patent is extended or adjusted under 35 U.S.C. 154(b) by 206 days.

(21) Appl. No.: 11/763,616

(22) Filed: Jun. 15, 2007

(65) Prior Publication Data

US 2008/0007114 A1     Jan. 10, 2008

Related U.S. Application Data

(60) Provisional application No. 60/813,981, filed on Jun. 15, 2006.

(51) Int. Cl.
    *G01N 3/08* (2006.01)
(52) U.S. Cl. ............................................. 73/818; 73/760
(58) Field of Classification Search ............ 73/760–860
    See application file for complete search history.

(56) References Cited

U.S. PATENT DOCUMENTS

| | | | |
|---|---|---|---|
| 4,147,939 A * | 4/1979 | Russell | 307/116 |
| 4,657,096 A * | 4/1987 | Angelbeck | 177/163 |
| 4,775,035 A | 10/1988 | Brodeur et al. | |
| 5,052,761 A | 10/1991 | Thöny | |
| 5,529,267 A * | 6/1996 | Giras et al. | 246/120 |
| 5,551,766 A | 9/1996 | Brushwood | |
| 5,603,556 A | 2/1997 | Klink | |
| 5,735,580 A | 4/1998 | Klink | |
| 6,092,468 A * | 7/2000 | Hase | 105/73 |
| 6,895,866 B2 * | 5/2005 | Forbes | 105/197.05 |
| 2003/0040885 A1 * | 2/2003 | Schoess et al. | 702/173 |

* cited by examiner

*Primary Examiner*—Max Noori
(74) *Attorney, Agent, or Firm*—Edward J Brosius

(57) ABSTRACT

A system to remotely report the load condition of a railroad car including a mechanism to sense the load condition in the form of a switch responsive to load condition to change the state of an electrical circuit, a controller to recognize the state of the circuit and a radio wave transmitter directed by the controller to report the condition to a remote receiver. Load is sensed by recognition of the distance between two components of the car, one which remains relatively fixed regardless of the weight of the car, the other which moves relative to the first component as the car weight changes.

7 Claims, 2 Drawing Sheets

US 7,685,884 B2

LOAD SENSING ARRANGEMENT

CROSS-REFERENCE TO RELATED APPLICATIONS

This patent application claims the benefit of U.S. Provisional Patent Application No. 60/813,981, filed Jun. 15, 2006, which is hereby incorporated by reference.

BACKGROUND OF THE INVENTION

This invention is directed to recognition and remote reporting of the load condition of a railroad car. More particularly, it is directed to a mechanism for sensing the load condition of a railroad car and a system for transmitting the condition to a remote receiver.

Railroad car location tracking systems utilizing global positioning are in use currently. It is useful to the car owner to know the location of the car at any given time. Knowledge of the load condition of a car, particularly a covered hopper car is an important element of the business model involved in the transport of fungible goods. The present invention fills that need.

BRIEF SUMMARY OF THE INVENTION

A system is provided to report the load condition of a railroad car. It includes a mechanism to sense the load condition of the car, a switch responsive to the sensed condition to switch an electrical circuit between a first state and a second state, a controller, responsive to the monitored condition of the circuit and a transmitter driven by the controller to transmit a radio wave indicative of the load condition of the car. Load is sensed by recognition of the distance between two components of the car, one which remains relatively fixed regardless of the weight of the car, the other which moves relative to the first component as the car weight changes.

DETAILED DESCRIPTION OF THE ILLUSTRATED EMBODIMENTS

Figure 1:
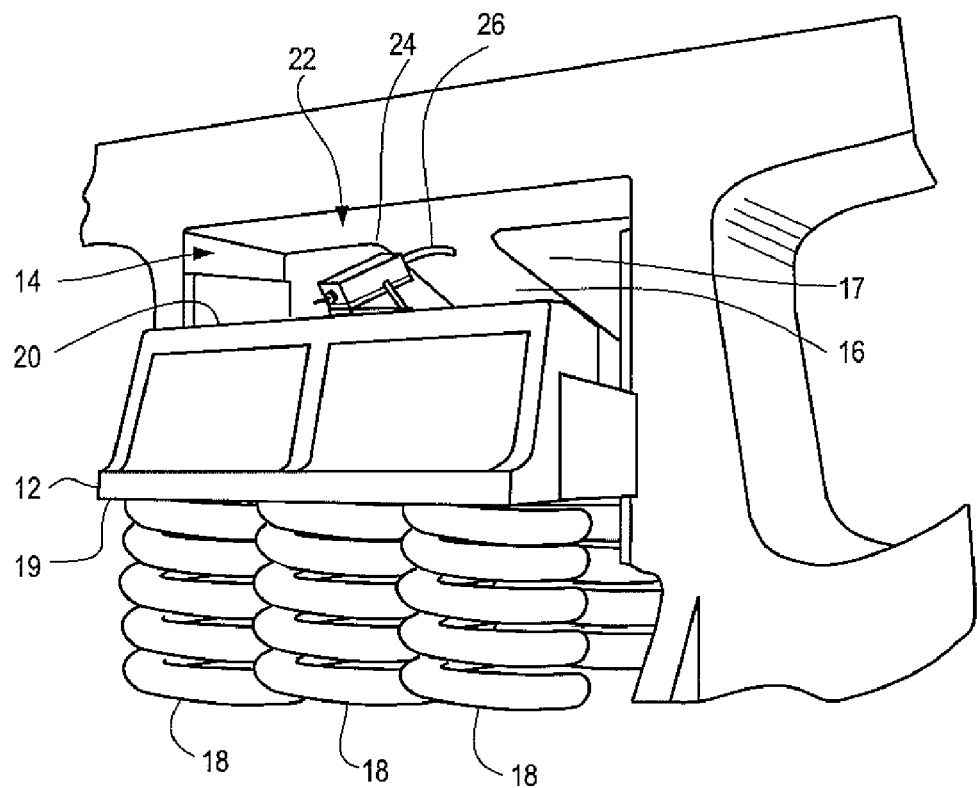
FIG. 1 is a perspective view illustrating a load condition sensor of the present invention installed between the side frame and bolster of a railroad car truck.

FIG. 1 illustrates a double axle wheel truck of a railroad car. The double axle wheel truck includes two side frames 10 and a bolster 12. Only one side frame is illustrated.

Each side frame defines a generally rectangular shaped opening or pocket 14 at the center of the side frame. An under surface 16 of cross member 17 of the side frame 10 defines the upper end of the opening or pocket 14. A bottom cross brace of the side frame (not shown) defines the bottom of the pocket 14.

Each transverse end of the bolster 12 extends into the pocket 14 in one of the side frames 10, as shown in FIG. 1.

Three springs 18 are positioned between a bottom surface 19 of the bolster 12 and the bottom cross brace of the side frame 10. The bolster also defines a top surface 20.

A car body (not shown) is typically mounted on the bolster 12. As the car is loaded, the increased weight of the car body and the lading applies a downward force on the bolster 12. The downward force compresses the springs 18 and increases the spacing between the top surface 20 of the bolster and the under surface 16 of cross member 17 of the side frame 10. The change in the distance between an empty car and a fully loaded one hundred ton capacity car, with D5 spring configuration, is approximately two and a half (2½) inches.

Figure 2:
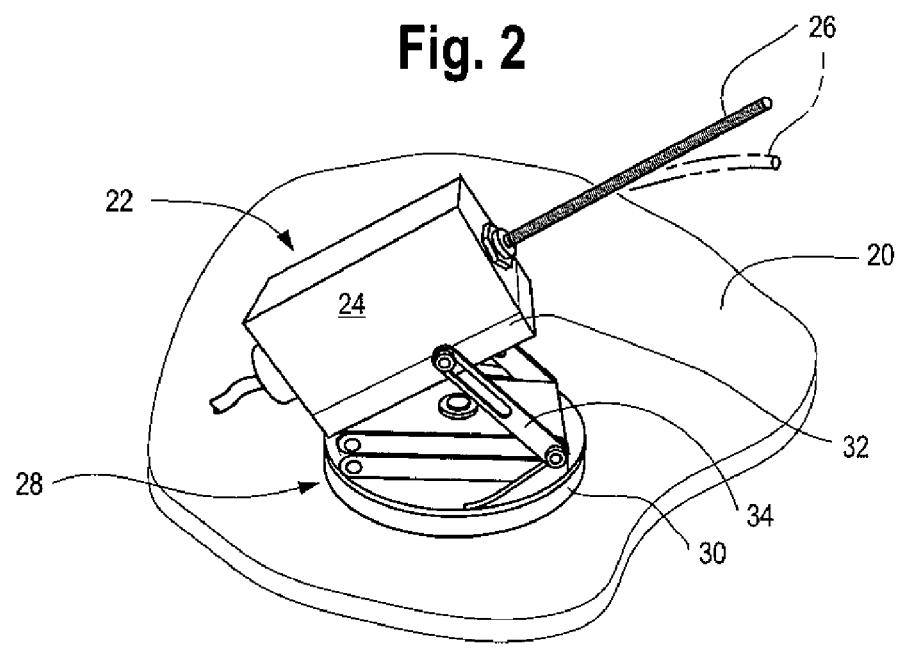
FIG. 2 is a perspective view of the load condition sensor apparatus of FIG. 1.

A first embodiment of a load condition sensor in accordance to the present invention is illustrated in FIGS. 1 and 2 and is generally designated 22. The load is sensed by recognition of the distance between two components of the car, one which remains relatively fixed regardless of the weight of the car, the other which moves relative to the first component as the car weight changes. In the embodiment of FIGS. 1 and 2, the load condition sensor 22 includes a switch assembly 24 and actuator 26, in the form of an elongated coil spring, extending from the switch assembly 24. Coil spring switches are commercially available from Omron Electronics LLC, Schaumburg, Ill. 60173.

In this embodiment switch assembly 24 is part of a wired electrical circuit. It is a normally closed switch. That is, when the spring 26 is in its normal or neutral position (unbent) the switch assembly is closed and any electrical circuit of which it is a component is a closed circuit. When the spring 26 is bent or curved as illustrated in FIG. 1 and by the dotted lines in FIG. 2, the switch is open and the state of the associated electrical circuit is open.

Because it is a coil spring, actuator 26 is inherently biased to assume a straight condition. The switch actuator or spring 26 includes a range of flexibility or displacement such that in all positions other than neutral, the switch assembly 24 is open. If the actuator is straight the switch is closed. If the actuator 26 is bent to a degree to open the switch assembly 24, further displacement or bending does not change the condition of the switch assembly 24 or the state of the associated electrical circuit.

The switch assembly 24 is supported by a mounting bracket 28. The bracket includes a magnetic base 30, a switch assembly platform 32, and linkage 34. The switch assembly 24 is mounted to the switch assembly platform 32. The linkage 34 connects the switch assembly platform 32 to the magnetic base 30. The linkage is adjustable to provide an angular relationship between the magnetic base 30 and the switch assembly platform 32.

While the load sensor 22 can be attached to the bolster 12 in a variety of ways, in this embodiment it is attached to the bolster 12 by the use of magnetic base 30. The use of a magnetic base 30 allows the load sensor to be mounted to the bolster without welding, thereby insuring compliance with rules of the American Association of Railroads regarding railroad car trucks.

As illustrated in FIG. 1, the load sensor 22 in the form of the switch device of the first embodiment is mounted on the top surface 20 of the bolster 12 at a location such that the switch actuator 26 is positioned beneath the under surface 16 of side frame 10 in pocket 14. The mounting bracket linkage 34 is adjusted to an angle to place the switch actuator 26 in a bent position as shown in FIG. 1 and by the dotted lines in FIG. 2 when the distance between the top surface 20 of bolster 12 and under surface 16 of cross member 17 and side frame 10 is at its smallest dimension, that is, when the car is empty. That is, as the car is loaded, that distance increases until the car is fully loaded.

With the spring actuator bent as illustrated in FIG. 1, the normally closed switch is open. The linkage is adjusted such that the switch assembly 24 is open, that is, the actuator 26 is bent sufficiently to maintain the switch assembly open, until the distance between the top surface 20 of the bolster 14 and the under surface 16 of the cross member 17 of side frame 10 represents a car that is about fifty (50) percent loaded. At that point, the switch actuator assumes its neutral or straight position as shown in FIG. 2 and switch assembly 24 closes. On closing, the switch changes the state of its associated electrical circuit. Further loading of the car increases the distance between surfaces 16 and 20 and the entire switch assembly 24 moves away from under surface 16 of side frame 10. The switch assembly remains closed, as does the state of the associated circuit.

Figure 3:
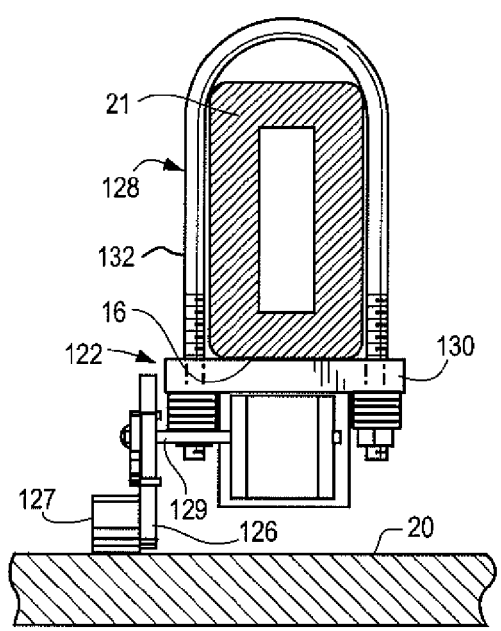
FIG. 3 is a fragmentary side elevational view partially in section of a different form of load condition sensor illustrative of the present invention installed between the side frame and bolster of a railroad car truck.
Figure 4:
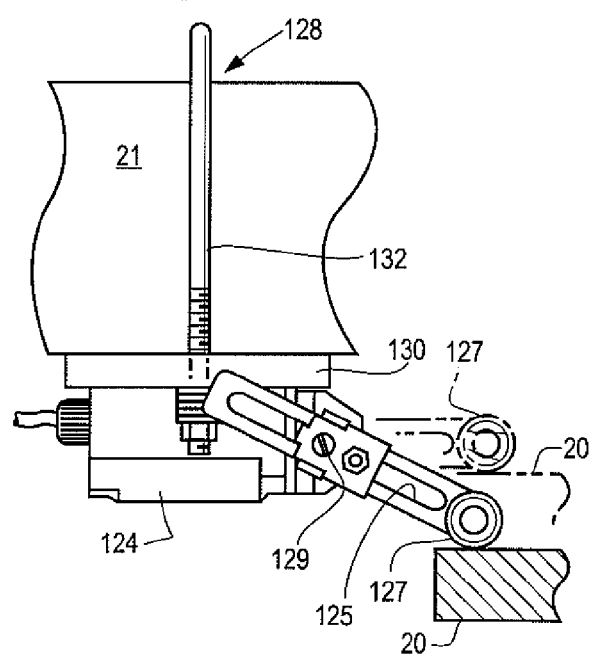
FIG. 4 is a side view of the load condition sensor of FIG. 3.

Turning now to FIGS. 3 and 4, the second embodiment of a load condition sensor in accordance with the invention is illustrated and generally designated 122. The alternative form of load sensor is shown in operational position on a railroad car truck. The truck is as illustrated in FIG. 1 and includes all of the same elements. Beam 21 is a part of the side frame casting. It defines under surface 16 of cross member 17. It overlies the top surface 20 of bolster 12.

The load condition sensor 122 includes a switch assembly 124 and actuator 126, in the form of pivotal arm 126 extending from a fulcrum shaft 129 of switch assembly 124. Rotary actuator switches are commercially available from Omron Electronics LLC, Schaumburg, Ill. 60173.

The pivotal arm 126 is spring loaded to a neutral position. Arm 126 and fulcrum shaft 129 are free to pivot from that position as illustrated by the dotted lines in FIG. 4. A spring within the switch assembly 124 biases the shaft 129 to the neutral position. The switch assembly 124 is a rotary switch and part of a wired circuit. When the arm 126 is at its neutral position, the switch assembly 124 is closed and the state of its associated circuit is closed. When the arm 126 is pivoted from its neutral position, the switch assembly is open and the associated circuit is open.

Pivotal arm 126 includes a roller follower 127 at its free end to permit it to contact a relatively moveable element to follow its movement. The spring bias of shaft 129 causes the arm 126 to return to its neutral position when not otherwise positioned by the relatively moveable element. The pivotal arm has a slot 125 to permit adjustment of its length between the fulcrum shaft 129 of the switch assembly 124 to the roller follower 127.

In this embodiment, and the embodiment of FIGS. 1 and 2, switch assemblies 24 and 124 are normally closed switches. It must be appreciated that switch assemblies 24 and 124 would be normally open switches and the associated circuit arranged accordingly It should also be recognized that the load condition sensors 24 and 124 of the illustrated embodiments are merely illustrative. Any form of sensor responsive to a change in position of the railroad car body that results from increasing or decreasing its weight would be usable in the reporting system of the present invention. As one example, a proximity switch could be employed wherein loading (or unloading) of a railroad car would cause the switch to change the state of an associated electrical circuit.

The switch actuator or pivotal arm 126 includes a range of flexibility or displacement such that in all positions other than neutral the switch assembly 124 is open. If the actuator 124 is at its neutral position urged there by the spring in the switch assembly 124, the switch is closed. If the actuator 126 is pivoted to a degree to open the switch assembly 124, further pivotal movement does not change the condition of the switch assembly or the state of the associated circuit.

The switch assembly 124 is supported by a mounting bracket 128. The bracket includes a base 130, and a "U" bolt 132. The switch assembly 124 is mounted to the base 130. The "U" bolt 132 surrounds the beam 21 and connects the base 130 to the beam 21. The pivotal arm 126 is adjustable to position the roller follower in contact with top surface 20 of bolster 12 with arm 126 pivoted from its neutral position an amount sufficient to open switch assembly 124 from its normally closed condition.

As illustrated in FIG. 3, the load sensor 122 in the form of the switch device of the second embodiment is mounted to beam 21 at a location such that the roller follower 127 contacts the top surface 20 of bolster 12. The length of pivotal arm 127 is adjusted relative to the fulcrum or switch actuator shaft 129 to displace the arm from its neutral position sufficiently such that the switch assembly 124 is open. It is adjusted to remain displaced from the neutral position until the distance between the top surface 20 of the bolster 14 and the under surface 16 of the cross member 17 of side frame 10 represents a car that is about fifty (50) percent loaded. At that point, the pivotal arm 126 assumes its neutral position and switch assembly 124 closes and changes the state of its associated circuit to closed. Further loading of the car increases the and the top surface 20 of bolster 19 moves away from the roller follower 127. The switch assembly 124 remains closed as does the associated circuit.

Figure 5:
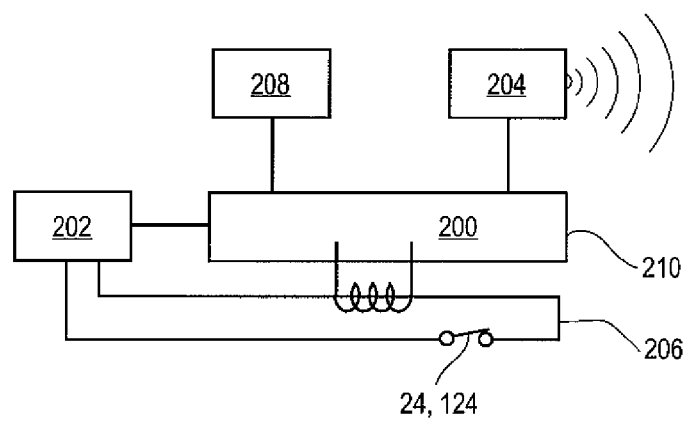
FIG. 5 is a schematic diagram illustrating the load sensing and reporting system.

Referring to FIG. 5, the system is shown that reports the car load condition. The system is an adjunct to the satellite communications device that reports the location of the car and other data. Such a device is available from Salco Products Inc. It is packaged with an "EVERSEE" brand preprogrammed, intrinsically safe GPS device that uses Globalstar Low-Earth-Orbiting Service to report the location of railroad cars and other data such as date and time. The battery powered device transmits data to Salco Products Inc. "Sky Passage" monitoring network software. The information is then made available to the railroad car owner through internet or other communication connections. The system transmits at scheduled intervals, usually twice every twenty-four hour period as well as when a condition change occurs. It provides information such as date, time, unit number, and location.

The device includes four R5232 ports to permit input of other condition reporting. Sensors of impact, temperature conditions (open or closed), presence of gas, pressure inside the car, hand brake condition and other important data can be provided to the transmitting device with the appropriate sensing equipment and circuitry.

The reporting system includes a programmable microprocessor or controller 200, a radio transmitter 204 and one or more input devices. The system is mounted to the car and is powered by a battery 202. In this illustrated system, one input device 212 is a global position recognition device (GPS Unit) 208 and supplies an input to the controller 200 which in turn, causes the radio transmitter to send data to a remote receiver (not shown). The controller 200 causes the transmitter 204 to send data to the remote receiver at predetermined intervals, and also on a change in condition.

The load sensor system of the present invention is a circuit 206 connected by wires to controller 200 through switch assembly 24 or 124. Controller 200 monitors the state of the circuit as at 210. When switch assembly 24 or 124 is closed, the state of the circuit 206 is closed. That condition is recognized by the controller 200 which causes transmitter 204 to send data indicative of the state of the circuit. When the condition of switch assembly 24 or 124 is changed, such as to an open position, the state of the circuit 206 changes. The controller 210 recognizes that change and the controller 206 causes the transmitter 204 to send a radio signal to the remote receiver indicative of the change.

Data is sent at preprogrammed intervals such as one every twelve (12) hours. The controller 200 also causes the transmitter 204 to send data to the receiver including data. indicative of the condition of the circuit 206 on any change of the state of circuit 206.

Various features of the present invention have been described with reference to the illustrated embodiments and should be understood that modifications may be made without departing from the scope of the present invention.

The invention claimed is:

1. A load sensing mechanism for a railroad car having a car truck with a bolster and side frame;
    said mechanism including a sensor to sense displacement of the bolster relative to the side frame;
    said sensor comprising an electrical switch assembly mounted to on of said side frame and bolster;
    an actuator connected to said switch assembly biased to a neutral position and moveable in a range of positions displaced from said neutral positions;
    said actuator contactable with the other of said side frame and bolster to displace said actuator from said neutral position at predetermined loads of the car;
    said switch assembly having one electrical state when said actuator is in said neutral position and another electrical state when said actuator is in said range of displaced positions; and
    said actuator being responsive to the weight of said car to move said switch between said neutral position and said range of displaced positions.

2. A load sensing mechanism as claimed in claim 1 wherein said actuator is spring biased to be straight in said neutral position and bent when displaced to said range of positions.

3. A load sensing mechanism as claimed in claim 1 wherein said actuator includes a fulcrum and shaft and a follower arm biased to said neutral position and pivoted to said range of displaced positions.

4. A load sensing mechanism as claimed in any one of claims 2 and 3 wherein said switch is a normally closed switch when said actuator is in said neutral position and is open when said actuator is in said range of displaced positions.

5. A system to report the load condition of a railroad car comprising:
    a mechanism to sense the load condition;
    an electrical circuit;
    a switch in said circuit responsive to the sensed condition to switch said electrical circuit between a first state and a second state at a predetermined load condition of said car;
    a controlled responsive to the state of the circuit and having an output indicative of the state of said circuit; and
    a transmitter receiving said output by said controller to transmit a radio wave indicative of the load condition of the car;
    wherein the mechanism to sense the load condition of the car comprises a first car element that remains relatively fixed regardless of the weight of the car and a second element that moves relative to the first car element as the weight changes; and
    wherein said railroad car comprises a car truck bolster and side frame;
    said load sensing mechanism includes a sensor to sense displacement of the bolster relative to the side frame;
    said sensor comprising an electrical switch assembly mounted to one of said side frame and bolster;
    said actuator connected to said switch assembly biased to a neutral position and moveable in a range of positions displaced from said neutral positions;
    said actuator contactable with the other of said side frame and bolster to displace said actuator from said neutral position at predetermined loads of the car;
    said switch assembly having one electrical state when said actuator is in said neutral position and another electrical state when said actuator is in said range of displaced positions; and
    said actuator being responsive to the weight of said car to move said switch between said neutral position and said range of displaced positions.

6. A system as claimed in claim 5 wherein said actuator is spring biased to be straight in said neutral position and bent when displaced to said range of positions.

7. A system as claimed in claim 5 wherein said actuator includes a fulcrum and shaft and a follower arm biased to said neutral position and pivotal to said range of displaced positions.

\* \* \* \* \*